United States Patent
Nagara et al.

(10) Patent No.: US 8,922,354 B2
(45) Date of Patent: Dec. 30, 2014

(54) EXTERNAL HAPTIC GENERATOR FOR PORTABLE ELECTRONIC DEVICES

(75) Inventors: Wes A. Nagara, Commerce Township, MI (US); Theodore Charles Wingrove, Plymouth, MI (US); Royce Duchante Channey, Ann Arbor, MI (US); Anthony Joseph Ciatti, Ann Arbor, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 886 days.

(21) Appl. No.: 13/070,574

(22) Filed: Mar. 24, 2011

(65) Prior Publication Data

US 2012/0242462 A1  Sep. 27, 2012

(51) Int. Cl.
H04B 3/36 (2006.01)
G06F 1/16 (2006.01)
G06F 3/01 (2006.01)

(52) U.S. Cl.
CPC ............... *G06F 1/1632* (2013.01); *G06F 3/016* (2013.01)
USPC ............ 340/407.1; 340/407.2; 340/4.12; 340/683; 340/636.1; 340/636.2; 710/303; 439/533

(58) Field of Classification Search
USPC .............. 340/407.1–407.2, 636.1, 636.2; 345/173; 710/303; 439/533
See application file for complete search history.

(56) References Cited

U.S. PATENT DOCUMENTS

| 4,879,759 | A  | * | 11/1989 | Matsumoto et al. | 455/348 |
| 5,353,017 | A  | * | 10/1994 | Suzuki et al. | 340/7.37 |
| 5,952,814 | A  | * | 9/1999 | Van Lerberghe | 320/108 |
| 6,113,395 | A  |   | 9/2000 | Hon | |
| 7,019,622 | B2 | * | 3/2006 | Orr et al. | 340/407.1 |
| 7,162,281 | B2 | * | 1/2007 | Kim | 455/575.1 |
| 7,206,407 | B2 | * | 4/2007 | Tomura et al. | 379/446 |
| 7,411,576 | B2 |   | 8/2008 | Massie et al. | |
| 7,414,380 | B2 | * | 8/2008 | Tang et al. | 320/108 |
| 7,834,857 | B2 | * | 11/2010 | Prados | 345/173 |
| 7,863,859 | B2 | * | 1/2011 | Soar | 320/108 |
| 8,040,224 | B2 | * | 10/2011 | Hwang | 340/407.2 |
| 8,061,670 | B1 | * | 11/2011 | White | 248/311.2 |
| 8,145,821 | B2 | * | 3/2012 | Mead et al. | 710/303 |
| 8,200,293 | B2 | * | 6/2012 | Park et al. | 455/575.1 |
| 8,310,444 | B2 | * | 11/2012 | Peterson et al. | 345/156 |
| 2005/0055187 | A1 |   | 3/2005 | Sherman et al. | |
| 2006/0071632 | A1 | * | 4/2006 | Ghabra et al. | 320/108 |
| 2008/0291161 | A1 |   | 11/2008 | Massie et al. | |
| 2009/0051509 | A1 |   | 2/2009 | Hwang | |
| 2009/0292851 | A1 | * | 11/2009 | Mead et al. | 710/303 |
| 2011/0121148 | A1 | * | 5/2011 | Pernia | 248/207 |
| 2013/0050112 | A1 | * | 2/2013 | Vanhelle et al. | 345/173 |

FOREIGN PATENT DOCUMENTS

DE 60315418 T2 5/2008
EP 1151595 A1 11/2001

* cited by examiner

Primary Examiner — Daniel Wu
Assistant Examiner — Son M Tang
(74) Attorney, Agent, or Firm — Dickinson Wright PLLC

(57) ABSTRACT

An external haptic generator for creating haptic feedback in portable electronic devices and more particularly, an external haptic generator in a vehicle providing a secure mount and creating haptic feedback in portable electronic devices that do not include haptic feedback generators.

10 Claims, 4 Drawing Sheets

EXTERNAL HAPTIC GENERATOR FOR PORTABLE ELECTRONIC DEVICES

BACKGROUND OF THE INVENTION

1. Technical Field

The present invention relates to an external haptic generator for creating haptic feedback in portable electronic devices and more particularly, to external haptic generators in vehicles capable of providing a secure mount for the portable electronic device and creating haptic feedback in portable electronic devices that do not include haptic feedback generators.

2. Discussion

Electronic devices are used throughout our daily lives for many things including communication, entertainment and time management. These electronic devices are increasingly becoming more portable and more powerful thereby allowing users to do an increasingly amount of activities remotely in the course of daily life. For example, many people have smart phones that allow them to access email, surf the web, and do other activities in addition to phone services. Other electronic devices commonly include traditional cell phones, music players, video players, tablets, and GPS navigation devices. More and more users are integrating these devices into motor vehicles.

While a vehicle is in motion, typically a lack of locations exist to securely mount the electronic device. Furthermore, such devices are powered by batteries and require the user to continually monitor battery life and recharge the batteries when needed. As electronic devices become increasingly complex, greater demands are placed on the batteries of the devices thereby shortening battery life. Therefore, many users desire locations in the vehicle that securely mount the electronic devices while they are also being charged and also allow access to the devices by vehicle occupants. For example, many users attach a cell phone to a charger cord plugged into a power outlet in the vehicle and then to prevent the cell phone from falling on the floor or underneath a seat, places the cell phone loosely in a free cup holder. Such placement within a cup holder is not desirable as the cell phone is typically not visible or useable by the occupant unless it is removed which may distract the operator of the vehicle. In vehicles where the cup holders are already in use, these electronic devices many times are free to slide off from a center console onto the floor or under the seat and a driver may become distracted while trying to retrieve the device or monitoring another vehicle occupant retrieving the device.

To improve and enhance the ability for users to interface with various electronic devices, some manufacturers have added haptic feedback device systems to the portable electronic device, however, most portable electronic devices still do not come with haptic feedback devices. In general, haptic feedback systems interface with a user via the sense of touch by applying forces, vibration, and/or other motions to a surface which is then felt by the user. Haptic feedback systems are helpful in providing the user with feedback without visual confirmation by the user especially when the input member is small to easily see, such as a touch screen on a mobile phone. Haptic feedback is very useful in situations where the ability of the user to visually confirm actions may be constrained, such as the operator of a vehicle attempting to provide input to or change settings on any of the portable electronic devices described above.

Most portable electronic devices do not include a haptic feedback generator, however, in view of the above, there is a desire to provide a system which allows for haptic feedback in certain circumstances even if the portable electronic device does not include its own internal haptic generator. In addition, there is a desire to provide a system that securely mounts and places the portable electronic device as well has the capability in certain circumstances to provide a charge to the portable electronic device.

SUMMARY OF THE INVENTION

The present invention relates to an external haptic generator for creating haptic feedback in portable electronic devices and more particularly, to external haptic generators in vehicles capable of providing a secure mount for the portable electronic device and creating haptic feedback in portable electronic devices that do not include haptic feedback generators.

The haptic system for provides haptic feedback in portable electronic devices that do not include integral haptic feedback devices and includes generally a holder configured to hold the portable electronic device; and a haptic generator located within the holder and in communication with the portable electronic device, the haptic generator capable of providing haptic feedback to the holder which is then transmitted to the portable electronic device coupled thereto. The holder is located on one of an instrument panel or center counsel of a vehicle and includes a connector capable of being in electrical communication with the portable electronic device. The holder may further include a wireless communication device capable of wireless interfacing with the portable electronic device and wherein the wireless communication device is in electrical communication with the haptic generator.

Some exemplary holders may include a base housing and a top housing, the base housing having a circumferential outer extent configured to fit within a cup holder in a vehicle and wherein the base housing includes a base and the top housing having a top surface and a front lip and wherein the top surface is angled relative to the outer extent and wherein the top surface is closer to the base proximate to the front lip than the top surface is to the base remote from the front lip and wherein the haptic generator is capable to creating haptic feedback on the top surface.

To provide power to the haptic generator, or even to a connector for charging the portable electronic device, the haptic may further including an inductive power supply.

In addition to separate holders, an instrument panel in a vehicle may be configured with the present invention to be capable of creating haptic feedback in a portable electronic device without haptic feedback capabilities. The instrument panel generally includes a portable electronic device mount capable of extending outwardly from the instrument panel in an open position and being approximately flush with the instrument panel in a second position and wherein the device mount includes a haptic generator in communication with the portable electronic device. The device mount may be one of a cup holder or a drawer and may include an electrical connector capable of interfacing with the portable electronic device. Furthermore, the instrument panel may further including a wireless communication device in electrical communication with the haptic generator and further capable of wirelessly interfacing with portable electronic devices. In some instances, the wireless communication device is a Bluetooth communication device.

The present invention may also be configured into a center counsel for a vehicle capable of creating haptic feedback in a portable electronic device without haptic feedback capabilities, the center counsel generally includes an outer housing defining a cup holder or a drawer, a haptic generator located within the housing and capable of providing haptic feedback to items with the cup holder or drawer. Again, the center counsel may further include a wireless communication device in electrical communication with the haptic generator.

BRIEF DESCRIPTION OF THE DRAWINGS

Further details, features and advantages of the invention will become readily apparent after review of the following description of examples of embodiment, with reference to the associated drawings. The drawings show

DETAILED DESCRIPTION OF THE PREFERRED EMBODIMENT

Figure 1:
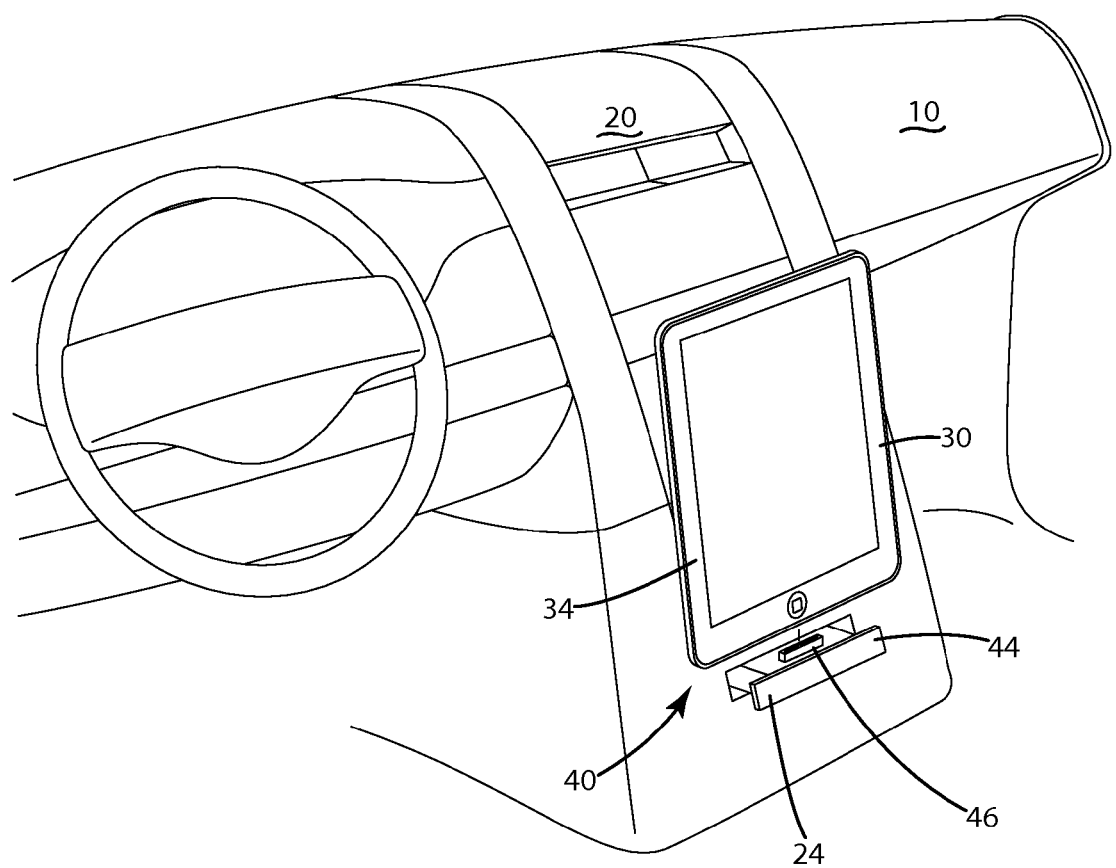
FIG. 1 illustrates the interior of a vehicle with a tablet being inserted onto an external haptic device.

The present invention is generally illustrated as being placed in a vehicle 10 specifically an automobile, however, any location where it is desirable to have haptic feedback from non-haptic portable electronic devices 30 may include the external haptic device 40 of the present invention. As described herein, the external haptic device 40 will be described as being configured within an automobile, however, other vehicles such as boats or planes may be used. The exemplary vehicle in the Figures includes an exemplary instrument panel 20 from the view of the operator of the vehicle. Of course, the instrument panel 20 may vary in size, shape and configuration depending upon desired design specifications and the location of the haptic devices mounted in the instrument panels and the illustrated recessed drawer 24 or cup holders 26 are only exemplary in location and configuration. In addition, a variety of other support mechanisms may be used to mount the portable electronic device which may include the external haptic device 40 of the present invention to create haptic feedback in the proximate portable electronic device 30. More specifically, in the motor vehicle, to minimize distraction during operation of the vehicle, the haptic feedback system provides the user with a touch feedback allowing the user to confirm that the desired input was properly entered and received by the vehicle or portable electronic device while allowing the user to stay visually focused where needed during the operation of the vehicle.

FIG. 1 generally illustrates a portable electronic device 30 as a tablet 34. The tablet 34 would include a device connector (not illustrated) to electronically couple with a connector 46 on the mount 44 in the recessed drawer 24. In addition to the recessed drawer 24, other support mechanisms may also be used to properly support the tablet in the desired location and in some embodiments, the tablet 34 may be configured to swivel to face either the driver or passenger of the vehicle.

Figure 2:
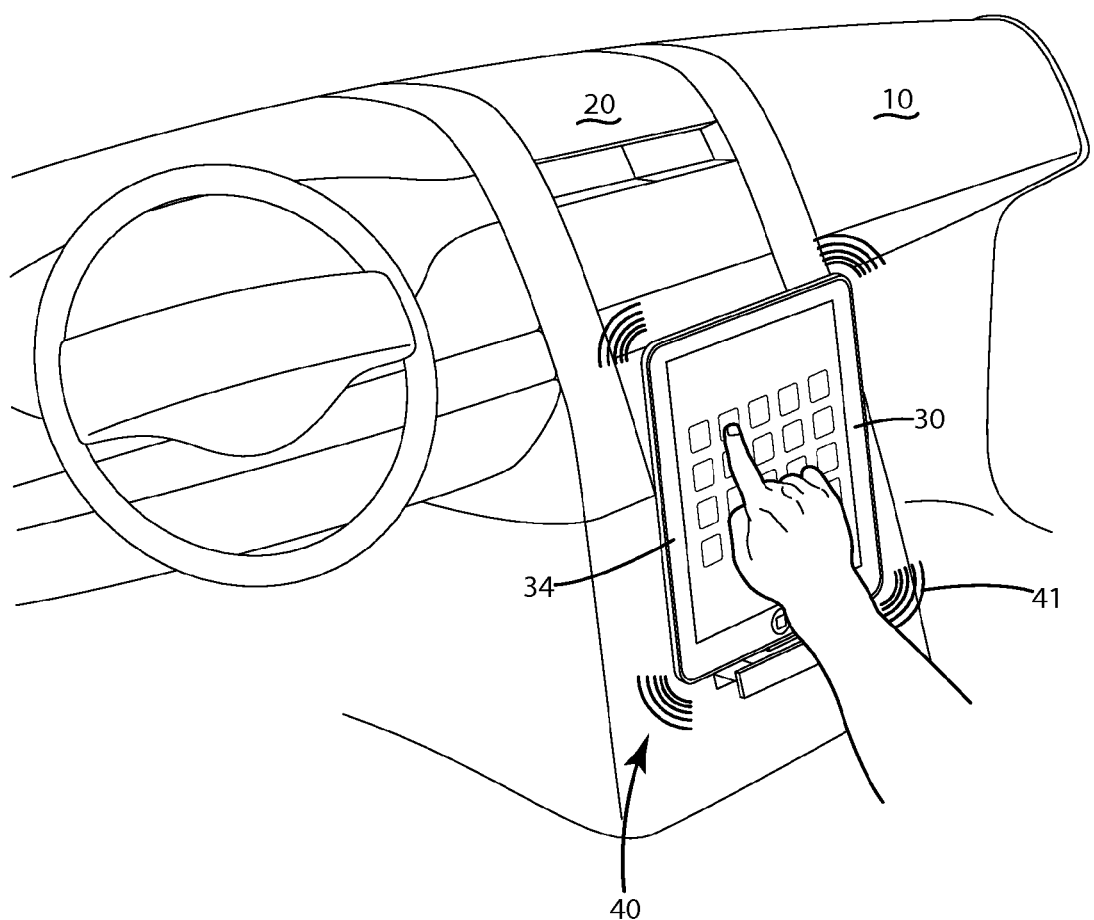
FIG. 2 illustrates the interior of a vehicle with a tablet showing haptic feedback from a user input.

FIG. 2 is similar to FIG. 1 except that the tablet 34 acting as a portable electronic device 30 has been connected to the connector 46 with the external haptic device 40 providing haptic feedback as illustrated by the vibration lines 41 in FIG. 2. The type of haptic feedback may be any desired haptic feedback to give the desired input feel. The present invention is configured as illustrated in FIG. 2 to allow a user to press a command on the portable electronic device 30 specifically as illustrated in FIG. 2 to a tablet 34 such that the user may feel that the command that has been entered into the portable electronic device 30 without needing to use visual confirmation. Of course, other portable electronic devices 30 may be substituted for the illustrated tablet 34 such as a phone which will allow haptic dialing of a phone number.

Figures 3, 4:
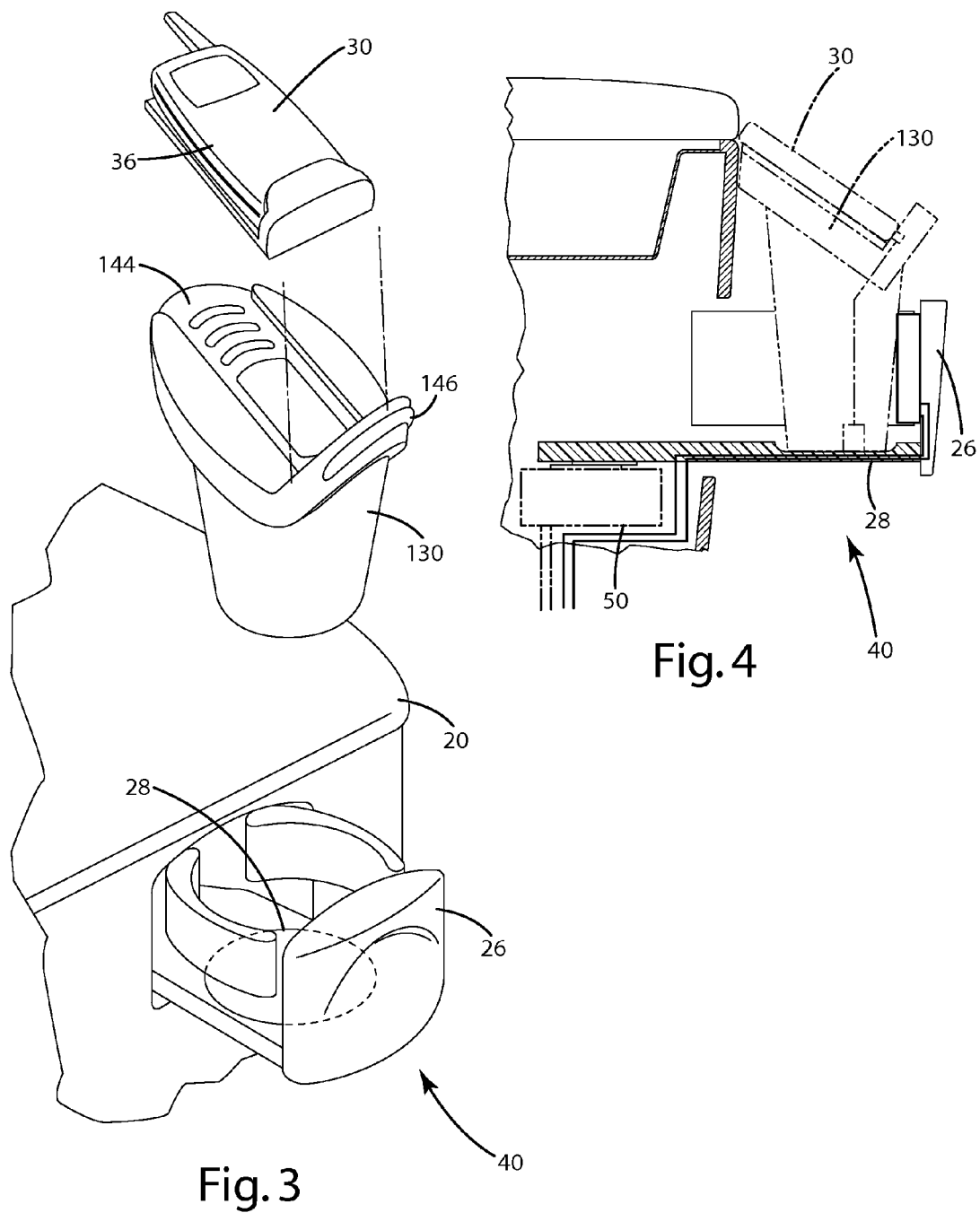
FIG. 3 is perspective view of an external haptic device configured as a holder on which a portable electronic device is placed.
FIG. 4 is a partial cross-sectional view of an external haptic device configured as the cup holder.

As illustrated in FIG. 3, the portable electronic device 30 may also be placed upon a separate holder 130 and placed further into a cup holder 26. Either the holder 130 or cup holder 26 may be configured to include a haptic generator 50 to create the external haptic device 40. As illustrated in FIGS. 3 and 4, the cup holder 26 acts as the haptic device 40. In comparison, the holder 130 in FIG. 5 acts as the external haptic device 40. Although not illustrated, in some embodiments, it may be possible for an external haptic device 40 to be inserted between the cup holder 26 and holder 130 such that a standard vehicle cup holder and a standard mount may be used while still providing haptic feedback to the portable electronic device 30. The haptic feedback may be done through direct electric communication such as the connector 46 illustrated in FIG. 1 and in phantom in FIG. 4. As more specifically illustrated in FIG. 4, the connector may be at the bottom of the cup holder and the haptic generator 50 may be in direct communication through the connectors to the electronic device 30. However, in some embodiments, the haptic device 40 and specifically the haptic generator 50 may be in communication with electronic device 30 via a Bluetooth or some other wireless method such that the instructions for the haptic feedback to the haptic generator is provided not through a direct wiring connector as illustrated in FIGS. 1 and 3 but instead through the wireless communication. As further illustrated in FIG. 3, the cup holder 26 may include a base 28 into which a connector may be situated though the connector and the base of the cup holder is not illustrated in FIG. 3. The holder 130 is exemplary in size, shape and configuration and is only shown to be configured to securely hold a portable electronic device such as a phone 36 in the desired orientation. The holder 130 is illustrated as having a locating mechanism 144 along with a status indicator 146. The status indicator may be used to communicate that the phone is charging or that the haptic feedback in either the holder 130 or cup holder 26 is active. The locating mechanism 144 may be configured to fit a variety of portable electronic devices and may vary in size, shape and configuration.

An exemplary sectional view of a cup holder 26 wherein the cup holder 26 forms the external haptic device 40 is illustrated in FIG. 4. With the cup holder 26 in an open position and a portable electronic device is situated on the base 28 or a holder 130 placed on the base 28 and in turn holding a portable electronic device 30, haptic feedback may be provided through the cup holder 26 using the haptic generator 50. The illustrated set up and location of the haptic generator 50 is only exemplary and a wide variety of sizes, shapes, configurations, and locations may be used so long as the portable electronic device 30 receives sufficient haptic feedback.

Figure 5:
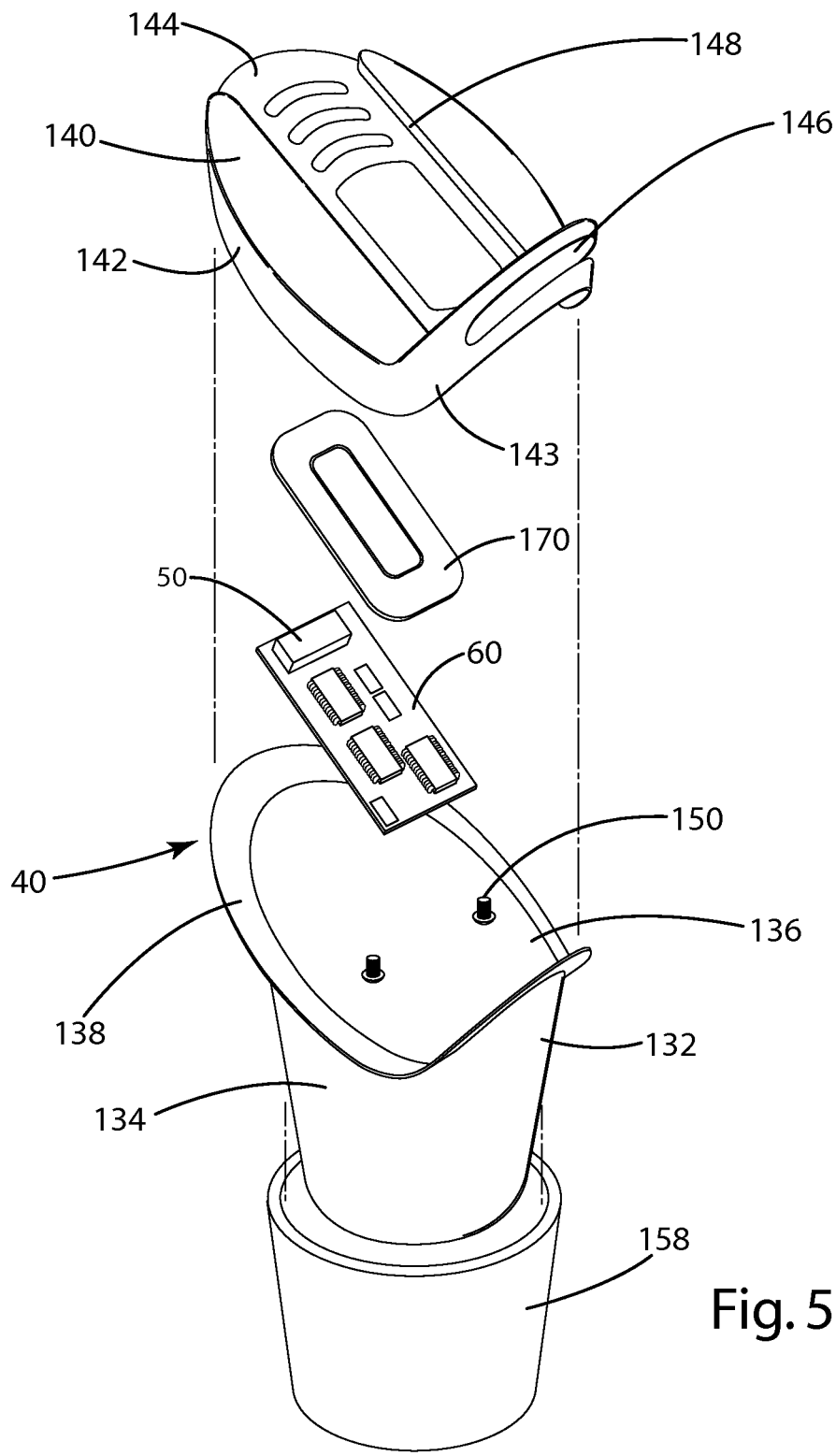
FIG. 5 is an exploded perspective view of a holder including a haptic generator that will fit in any non-haptic cup holder.

The present invention will now be described wherein the haptic feedback is provided through an external haptic device 40 acting as a holder 130 for the electronic device 30 and is not specifically originally built into the vehicle or the portable electronic device is not capable by itself of haptic feedback. The external haptic device 40 is generally configured to fit within a cup holder 26 as illustrated in FIGS. 3-5. The cup holder 26 generally includes sidewalls which retain the holder 130 in position and a base 28 on which the holder may rest. As discussed above, the cup holder 26 may be configured to have a pin connector built into the base 28. However, such that the cup holder may be used when the holder 130 is not positioned therein, a separate cover (not shown) may be placed over the connector on which a cup would normally rest in the cup holder 26. However, as illustrated in FIG. 5, the holder 130 may also receive power through an inductive coil 170 and use that power to drive the electronics 60 and specifically the haptic generator 50 in the holder 130. Using an inductive coil 170 would allow the holder 130 to take on any size, shape, configuration or be placed anywhere desirable in the vehicle without having to attach special connectors and allow its use in vehicles not originally configured with an external haptic device built into the vehicle.

The holder 130 generally includes a base housing 132 and a top housing 140. The base housing 132 is configured to fit within the cup holder 26 while the top housing 140 is configured to receive and securely retain for optimal haptic feedback the portable electronic device 30.

The base housing 132 is generally illustrated in FIG. 5 as having a circumferential outer surface 134 arranged about a longitudinal axis. The circumferential outer surface 134 is generally configured to be cup-shaped and allows the base housing 132 to be inserted similar to most existing cups into standard cup holders 26 and, as such, be securely retained in the cup holder 26. As illustrated in FIG. 5 at times an extra insert 158 may be used to provide a more secure fit in certain cup holders that are designed for over-sized cups.

The base housing 132 further includes a slanted portion 136. The angle of the slanted portion 136 may vary depending upon the desired configuration to allow for various locations in the vehicle and allow the user of the external haptic device 40 the best angle to both enter items into the portable electronic device but also to receive the desired haptic feedback.

The top housing 140 generally includes an outer lip 142 for engaging the outer lip 138 of the base housing 132. The top housing 140 generally includes a locating mechanism 144 having a recessed surface and locating edges 148. The edges 148 may act as stops to prevent the electronic device 30 from being displaced off the top surface of the top housing 140. A front lip 143 may also act as an alignment indicator and in some instances may include a status indicator 146. The haptic driver 50 would engage the top surface 140 and thereby provide haptic feedback to the portable electronic device.

What is claimed is:

1. A haptic system for providing haptic feedback in portable electronic devices that do not include integral haptic feedback devices:
    a holder configured to hold the portable electronic device; and
    a haptic generator located within the holder and in communication with the portable electronic device, said haptic generator provides haptic feedback to the holder which is then transmitted to the portable electronic device coupled thereto,
    wherein said holder includes a base housing and a top housing, said base housing having a circumferential outer extent configured to fit within a cup holder in a vehicle and wherein said base housing includes a base and said top housing having a top surface and a front lip and wherein said top surface is angled relative to said outer extent and wherein said top surface is closer to said base proximate to said front lip than said top surface is to said base remote from said front lip and wherein said haptic generator creates haptic feedback on said top surface, and
    an inductive coil to power said holder and to power said haptic generator.

2. The haptic system of claim 1 wherein said holder is located on one of an instrument panel, seat, or center counsel of a vehicle and includes a connector in electrical communication with the portable electronic device.

3. The haptic system of claim 1 wherein said holder further includes a wireless communication device that wirelessly interfaces with the portable electronic device and wherein said wireless communication device is in electrical communication with said haptic generator.

4. An instrument panel for a vehicle to create haptic feedback in a portable electronic device without haptic feedback capabilities, said instrument panel comprising:
    a portable electronic device mount to extend outwardly from the instrument panel in an open position and being approximately flush with the instrument panel in a second position and wherein said device mount includes a haptic generator in communication with the portable electronic device,
    wherein the portable device mount is a holder, the holder includes a base housing and a top housing, said base housing having a circumferential outer extent configured to fit within a cup holder in a vehicle and wherein said base housing includes a base and said top housing having a top surface and a front lip and wherein said top surface is angled relative to said outer extent and wherein said top surface is closer to said base proximate to said front lip than said top surface is to said base remote from said front lip and wherein said haptic generator creates haptic feedback on said top surface, and
    an inductive coil to power said holder and to power said haptic generator.

5. The instrument panel of claim 4 wherein said device mount is a drawer and includes an electrical connector interfaces with said portable electronic device.

6. The instrument panel of claim 4 further including a wireless communication device in electrical communication with said haptic generator and further wireless interfaces with portable electronic devices.

7. The instrument panel of claim 6 wherein said wireless communication device is a Bluetooth communication device.

8. A center console for a vehicle capable of creating haptic feedback in a portable electronic device without haptic feedback capabilities, said center counsel comprising:
    an outer housing defining a cup holder;
    a haptic generator located within said housing and provides haptic feedback to items with said cup holder, and
    wherein said cup holder includes a base housing and a top housing, said base housing having a circumferential outer extent configured to fit within the cup holder in a vehicle and wherein said base housing includes a base and said top housing having a top surface and a front lip and wherein said top surface is angled relative to said outer extent and wherein said top surface is closer to said base proximate to said front lip than said top surface is to said base remote from said front lip and wherein said haptic generator creates haptic feedback on said top surface, and
    an inductive coil to power to said holder and to power said haptic generator.

9. The center console of claim 8 further including a wireless communication device in electrical communication with said haptic generator.

10. The center console of claim 9, wherein the cup holder's top surface further comprises an edge to prevent the wireless communication device from being displaced from the top surface.

* * * * *